(12) United States Patent
Furukawa et al.

(10) Patent No.: US 7,139,284 B1
(45) Date of Patent: Nov. 21, 2006

(54) SPREAD CODE ALLOCATION METHOD AND BASE STATION IN CDMA CELLULAR

(75) Inventors: Hiroshi Furukawa, Minato-ku (JP); Akihisa Ushirokawa, Minato-ku (JP)

(73) Assignee: NEC Corporation (JP)

( * ) Notice: Subject to any disclaimer, the term of this patent is extended or adjusted under 35 U.S.C. 154(b) by 615 days.

(21) Appl. No.: 09/699,648

(22) Filed: Oct. 31, 2000

(30) Foreign Application Priority Data

Nov. 1, 1999 (JP) ............................. 11/311603

(51) Int. Cl.
H04B 7/216 (2006.01)

(52) U.S. Cl. ..................... 370/441; 370/335; 370/342

(58) Field of Classification Search ................ 370/329, 370/443, 444, 335, 441, 342, 328, 208, 209; 455/450, 453, 522
See application file for complete search history.

(56) References Cited

U.S. PATENT DOCUMENTS

| | | | | |
|---|---|---|---|---|
| 5,448,750 A | * | 9/1995 | Eriksson et al. | 455/452.2 |
| 5,491,837 A | * | 2/1996 | Haartsen | 455/62 |
| 5,530,917 A | * | 6/1996 | Andersson et al. | 455/436 |
| 5,724,378 A | * | 3/1998 | Miki et al. | 375/148 |
| 6,023,623 A | * | 2/2000 | Benkner et al. | 455/452.2 |
| 6,035,210 A | * | 3/2000 | Endo et al. | 455/522 |
| 6,091,717 A | * | 7/2000 | Honkasalo et al. | 370/329 |
| 6,389,138 B1 | * | 5/2002 | Li et al. | 380/35 |
| 6,421,335 B1 | * | 7/2002 | Kilkki et al. | 370/342 |
| 6,504,832 B1 | * | 1/2003 | Koo et al. | 370/342 |
| 6,519,461 B1 | * | 2/2003 | Andersson et al. | 455/453 |
| 6,556,834 B1 | * | 4/2003 | Kobayashi et al. | 455/464 |
| 6,574,204 B1 | * | 6/2003 | Lee | 370/335 |
| 6,580,703 B1 | * | 6/2003 | Okubo et al. | 370/335 |
| 6,636,496 B1 | * | 10/2003 | Cho et al. | 370/335 |
| 6,778,943 B1 | * | 8/2004 | Kurien et al. | 702/183 |

FOREIGN PATENT DOCUMENTS

| | | |
|---|---|---|
| CA | 2 300 007 | 12/2003 |
| EP | 1 076433 | 2/2001 |
| JP | 11-41192 | 2/1999 |
| JP | 11-150525 | 6/1999 |

OTHER PUBLICATIONS

Japanese Office Action issued Oct. 1, 2002 (w/ English translation of relevant portion).
Tero Ojanpera, et al. "Wideband CDMA for Third Generation Mobile Communication," Artech House, England, Jan. 1, 1998, pp. 114-115.

* cited by examiner

Primary Examiner—Doris H. To
Assistant Examiner—Steve Blount
(74) Attorney, Agent, or Firm—Dickstein, Shapiro, LLP.

(57) ABSTRACT

A spread code allocation method in a CDMA cellular having a first code set including a plurality of first codes and a second code set including one or a plurality of second codes, allocating the second code to the first code set and multiplying the plurality of first codes by the allocated second code to generate a plurality of combined codes, assigning a priority to the combined code for each transmission signal to be transmitted from a base station to a mobile station, allocating the combined code to the transmission signal based on the priority, and diffusing the transmission signal by the allocated combined code to transmit the diffused transmission signal to the mobile station.

32 Claims, 12 Drawing Sheets

FIG. 4

SCRAMBLE CODE NUMBER

ORTHOGONAL CODE NUMBER

| | 1 | 2 | ... |
|---|---|---|---|
| 1 | 7 | 11 | ... |
| 2 | 2 | 16 | ... |
| 3 | 8 | 14 | ... |
| 4 | 1 | 9 | ... |
| 5 | 4 | 13 | ... |
| 6 | 6 | 10 | ... |
| 7 | 3 | 12 | ... |
| 8 | 5 | 15 | ... |

(a) CHANNEL QUALITY VALUE CLASS Q1

SCRAMBLE CODE NUMBER

ORTHOGONAL CODE NUMBER

| | 1 | 2 | ... |
|---|---|---|---|
| 1 | 11 | 7 | ... |
| 2 | 16 | 2 | ... |
| 3 | 14 | 8 | ... |
| 4 | 9 | 1 | ... |
| 5 | 13 | 4 | ... |
| 6 | 10 | 6 | ... |
| 7 | 12 | 3 | ... |
| 8 | 15 | 5 | ... |

(b) CHANNEL QUALITY VALUE CLASS Q2

FIG. 5

SCRAMBLE CODE NUMBER

ORTHOGONAL CODE NUMBER

| | 1 | 2 | ... |
|---|---|---|---|
| 1 | 1 | 9 | ... |
| 2 | 2 | 10 | ... |
| 3 | 3 | 11 | ... |
| 4 | 4 | 12 | ... |
| 5 | 5 | 13 | ... |
| 6 | 6 | 14 | ... |
| 7 | 7 | 15 | ... |
| 8 | 8 | 16 | ... |

(a) CHANNEL QUALITY VALUE CLASS Q1

SCRAMBLE CODE NUMBER

ORTHOGONAL CODE NUMBER

| | 1 | 2 | ... |
|---|---|---|---|
| 1 | 9 | 1 | ... |
| 2 | 10 | 2 | ... |
| 3 | 11 | 3 | ... |
| 4 | 12 | 4 | ... |
| 5 | 13 | 5 | ... |
| 6 | 14 | 6 | ... |
| 7 | 15 | 7 | ... |
| 8 | 16 | 8 | ... |

(b) CHANNEL QUALITY VALUE CLASS Q2

FIG. 7

SCRAMBLE CODE NUMBER

| Orthogonal Code Number | 1 | 2 | ... |
|---|---|---|---|
| 1 | 7 | 11 | ... |
| 2 | 2 | 16 | ... |
| 3 | 8 | 14 | ... |
| 4 | 1 | 9 | ... |
| 5 | 4 | 13 | ... |
| 6 | 6 | 10 | ... |
| 7 | 3 | 12 | ... |
| 8 | 5 | 15 | ... |

(a) TRANSMISSION SIGNAL OF TRANSMISSION QUALITY REQUIRED AMOUNT CLASS Qo-a

SCRAMBLE CODE NUMBER

| Orthogonal Code Number | 1 | 2 | ... |
|---|---|---|---|
| 1, 2 | 5 | 1 | ... |
| 3, 4 | 8 | 3 | ... |
| 5, 6 | 7 | 2 | ... |
| 7, 8 | 6 | 4 | ... |

(b) TRANSMISSION SIGNAL OF TRANSMISSION QUALITY REQUIRED AMOUNT CLASS Qo-b

FIG. 8

SCRAMBLE CODE NUMBER

ORTHOGONAL CODE NUMBER

| | 1 | 2 | ... |
|---|---|---|---|
| 1 | 1 | 9 | ... |
| 2 | 2 | 10 | ... |
| 3 | 3 | 11 | ... |
| 4 | 4 | 12 | ... |
| 5 | 5 | 13 | ... |
| 6 | 6 | 14 | ... |
| 7 | 7 | 15 | ... |
| 8 | 8 | 16 | ... |

(a) TRANSMISSION SIGNAL OF TRANSMISSION QUALITY REQUIRED AMOUNT CLASS $Q_{o\text{-}a}$

SCRAMBLE CODE NUMBER

ORTHOGONAL CODE NUMBER

| | 1 | 2 | ... |
|---|---|---|---|
| 1, 2 | 5 | 1 | ... |
| 3, 4 | 6 | 2 | ... |
| 5, 6 | 7 | 3 | ... |
| 7, 8 | 8 | 4 | ... |

(b) TRANSMISSION SIGNAL OF TRANSMISSION QUALITY REQUIRED AMOUNT CLASS $Q_{o\text{-}b}$

FIG.10

SCRAMBLE CODE NUMBER

|  | | 1 | 2 | 3 | 4 |
|---|---|---|---|---|---|
| | 1 | 22 | 32 | 9 | 2 |
| | 2 | 20 | 26 | 14 | 7 |
| | 3 | 19 | 30 | 13 | 3 |
| ORTHOGONAL | 4 | 24 | 31 | 15 | 4 |
| CODE NUMBER | 5 | 21 | 25 | 11 | 6 |
| | 6 | 18 | 27 | 16 | 5 |
| | 7 | 23 | 29 | 12 | 1 |
| | 8 | 17 | 28 | 10 | 8 |

(a) CHANNEL QUALITY VALUE ≧ QUALITY THRESHOLD VALUE

SCRAMBLE CODE NUMBER

|  | | 1 | 2 | 3 | 4 |
|---|---|---|---|---|---|
| | 1 | 9 | 2 | 22 | 32 |
| | 2 | 14 | 7 | 20 | 26 |
| | 3 | 13 | 3 | 19 | 30 |
| ORTHOGONAL | 4 | 15 | 4 | 24 | 31 |
| CODE NUMBER | 5 | 11 | 6 | 21 | 25 |
| | 6 | 16 | 5 | 18 | 27 |
| | 7 | 12 | 1 | 23 | 29 |
| | 8 | 10 | 8 | 17 | 28 |

(b) CHANNEL QUALITY VALUE < QUALITY THRESHOLD VALUE

FIG.11

SCRAMBLE CODE NUMBER

|   | 1 | 2 | 3 | 4 |
|---|---|---|---|---|
| 1 | 17 | 25 | 9 | 1 |
| 2 | 18 | 26 | 10 | 2 |
| 3 | 19 | 27 | 11 | 3 |
| 4 | 20 | 28 | 12 | 4 |
| 5 | 21 | 29 | 13 | 5 |
| 6 | 22 | 30 | 14 | 6 |
| 7 | 23 | 31 | 15 | 7 |
| 8 | 24 | 32 | 16 | 8 |

ORTHOGONAL CODE NUMBER (a) CHANNEL QUALITY VALUE $\geqq$ QUALITY THRESHOLD VALUE

SCRAMBLE CODE NUMBER

|   | 1 | 2 | 3 | 4 |
|---|---|---|---|---|
| 1 | 9 | 1 | 17 | 25 |
| 2 | 10 | 2 | 18 | 26 |
| 3 | 11 | 3 | 19 | 27 |
| 4 | 12 | 4 | 20 | 28 |
| 5 | 13 | 5 | 21 | 29 |
| 6 | 14 | 6 | 22 | 30 |
| 7 | 15 | 7 | 23 | 31 |
| 8 | 16 | 8 | 24 | 32 |

ORTHOGONAL CODE NUMBER (b) CHANNEL QUALITY VALUE $<$ QUALITY THRESHOLD VALUE

SPREAD CODE ALLOCATION METHOD AND BASE STATION IN CDMA CELLULAR

BACKGROUND OF THE INVENTION

1. Field of the Invention

The present invention relates to a spread code allocation method and a base station in a CDMA cellular in which transmission signals directed from a base station to a plurality of mobile stations are spread and transmitted using spreading codes.

2. Description of the Related Art

On the downlink of a CDMA cellular, transmission signals directed to a plurality of mobile stations are spread and multiplexed by different spreading codes at a base station and then transmitted in a group. On the downlink, transmission signals can be synchronized with each other with ease because signals directed to the plurality of mobile stations are transmitted from the base station in a group. It is therefore possible to suppress interference between transmission signals by spreading each transmission signal by an orthogonal synchronization code.

On the other hand, since signals on a downlink from other base stations are hard to synchronize with each other, employed as a means for suppressing interference from these base stations is a method of multiplying an orthogonal synchronization code by a scramble code inherent to a base station. Used here as a scramble code is a gold code or the like.

Structure of a base station transmission device using the present method is shown in FIG. 12. In a spreading addition device spu shown in FIG. 12, a transmission signal Si (i: mobile station number) directed to a mobile station and a orthogonal code Co, i are multiplied at a multiplier 001, the multiplied output signal is added at an adder 002 and the output signal of the adder 002 is multiplied by a scramble code Cs at the multiplier 005 to output a composite spreading signal sd. The composite spreading signal sd is modulated at a modulation device 003 and then transmitted from an antenna 004 to each mobile station.

Use of the above described diffusion method shown in FIG. 12 by all the base stations results in randomizing interference of a downlink from other base station received at a mobile station, so that together with error correcting codes, interference can be suppressed.

Since code consumption is accelerated in a CDMA cellular system for the following reasons, there often occur a lack of orthogonal codes.

First, when Soft Hand-Over (SHO) is applied, because a plurality of base stations transmit the same signal for one mobile station, more codes are consumed as compared with those consumed when no SHO is applied. In addition, since in a voiceless period, signal transmission is temporarily stopped to reduce interference, thereby accommodating more mobile stations, more codes are consumed than those in the transmission of information sources being on all the time. Moreover, since code consumption is changed also with propagation environments and in a case where many shielding objects exist on a propagation path or other case, interference of other cells is well suppressed to increase a capacity, code consumption at a base station is increased.

For the foregoing reasons, when more mobile stations are connected to a base station than the number of orthogonal codes, a lack of spreading codes is coped with by the use of a plurality of scramble codes at one base station.

FIG. 13 is a diagram showing a structure of a base station transmission device in a case where a number k of scramble codes are used. At a spreading addition device spu-j (j: scramble code number), a transmission signal Si, h (h: orthogonal code number), a orthogonal code Co, h and a scramble code Cs, j are applied to output a composite spreading signal sd-j. nj in FIG. 13 denotes the number of uses of a orthogonal code generated by a j-th scramble code.

After subjected to addition at an adder 002, the output sd-j of the composite spreading signal is modulated at a modulation device 003 and then output to each mobile station through an antenna 004.

In a case where base station simultaneously uses a plurality of scramble codes as shown in FIG. 13, and the transmission signals have different required qualities such as transmission rate, required bit error rate, and different reception qualities depending on where a mobile station is within a cell, the amount of interference, etc. The degree of interference that each transmission signal has varies due to a difference in allocated scramble code thereby causing inequality in communication quality and deterioration due to interference.

SUMMARY OF THE INVENTION

An object of the present invention is to provide a spread code allocation method and a base station in a CDMA cellular enabling control of interference between mobile stations having different required qualities and reception qualities, mitigation of inequality in signal reception qualities at mobile stations and suppression of deterioration by interference caused by inequality by changing priorities of spreading codes according to a required quality and a reception quality.

According to one aspect of the invention, a spread code allocation method in a CDMA cellular, comprising the steps of having a first code set including a plurality of first codes and a second code set including one or a plurality of second codes, allocating the second code to the first code set and multiplying the plurality of first codes by the second code allocated to generate a plurality of combined codes, assigning a priority to the combined code for each transmission signal to be transmitted from a base station to a mobile station, allocating the combined code to the transmission signal based on the priority, and diffusing the transmission signal by the allocated combined code to transmit the transmission signal diffused to the mobile station.

In the referred construction, the spread code allocation method in a CDMA cellular further comprising the step of, at a plurality of the mobile stations, measuring a channel quality value and informing the base station of the channel quality value and at the base station, determining a priority of the combined code based on the channel quality value informed.

In another preferred construction, the spread code allocation method in a CDMA cellular further comprising the steps of at a plurality of the mobile stations, measuring a channel quality value and informing the base station of the channel quality value and at the base station, determining a priority of the combined code based on the channel quality value informed, and setting a priority to the second code according to the channel quality value and setting a priority of the combined code to be higher as the second code attains a higher priority.

In another preferred construction, the spread code allocation method in a CDMA cellular further comprising the steps of at a plurality of the mobile stations, measuring a channel quality value and informing the base station of the channel quality value and at the base station, determining a priority of the combined code based on the channel quality value informed, setting a priority to the second code according to the channel quality value and setting a priority of the combined code to be higher as the second code attains a higher priority, and providing an axis of a channel quality value representing the channel quality value and dividing the axis of a channel quality value by a plurality of threshold values to set a channel quality value within the same value area among a plurality of value areas generated by the division by the threshold values to have the same priority of the second code.

In another preferred construction, the spread code allocation method in a CDMA cellular further comprising the steps of at a plurality of the mobile stations, measuring a channel quality value and informing the base station of the channel quality value and at the base station, determining a priority of the combined code based on the channel quality value informed, and setting a priority to the first code and setting a priority of each combined code in a group of combined codes including the same second code to be higher as the first code attains a higher priority.

In another preferred construction, the spread code allocation method in a CDMA cellular further comprising the steps of at a plurality of the mobile stations, measuring a channel quality value and informing the base station of the channel quality value and at the base station, determining a priority of the combined code based on the channel quality value informed, setting a priority to the first code and setting a priority of each combined code in a group of combined codes including the same second code to be higher as the first code attains a higher priority, and providing an axis of a channel quality value representing the channel quality value and dividing the axis of a channel quality value by a plurality of threshold values to set a channel quality value within the same value area among a plurality of value areas generated by the division by the threshold values to have the same priority of the first code.

In another preferred construction, the spread code allocation method in a CDMA cellular further comprising the step of grasping a transmission quality required amount required by a mobile station receiving each the transmission signal to determine a priority of the combined code based on the transmission quality required amount.

In another preferred construction, the spread code allocation method in a CDMA cellular further comprising the steps of grasping a transmission quality required amount required by a mobile station receiving each the transmission signal to determine a priority of the combined code based on the transmission quality required amount, and setting a priority to the second code according to the transmission quality required amount and setting a priority of the combined code to be higher as the second code attains a higher priority.

In another preferred construction, the spread code allocation method in a CDMA cellular further comprising the steps of grasping a transmission quality required amount required by a mobile station receiving each the transmission signal to determine a priority of the combined code based on the transmission quality required amount, setting a priority to the second code according to the transmission quality required amount and setting a priority of the combined code to be higher as the second code attains a higher priority, and providing an axis of a transmission quality required amount representing the transmission quality required amount and dividing the axis of a transmission quality required amount by a plurality of threshold values to set a transmission quality required amount within the same value area among a plurality of value areas generated by the division by the threshold values to have the same priority of the second code.

In another preferred construction, the spread code allocation method in a CDMA cellular further comprising the steps of grasping a transmission quality required amount required by a mobile station receiving each the transmission signal to determine a priority of the combined code based on the transmission quality required amount, and setting a priority to the first code according to the transmission quality required amount and setting a priority of each combined code in a group of the combined codes including the same second code to be higher as the first code attains a higher priority.

In another preferred construction, the spread code allocation method in a CDMA cellular further comprising the steps of grasping a transmission quality required amount required by a mobile station receiving each the transmission signal to determine a priority of the combined code based on the transmission quality required amount, setting a priority to the first code according to the transmission quality required amount and setting a priority of each combined code in a group of the combined codes including the same second code to be higher as the first code attains a higher priority, and providing an axis of a transmission quality required amount representing the transmission quality required amount and dividing the axis of a transmission quality required amount by a plurality of threshold values to set a transmission quality required amount within the same value area among a plurality of value areas generated by the division by the threshold values to have the same priority of the first code.

In another preferred construction, the spread code allocation method in a CDMA cellular further comprising the step of grasping a transmission quality required amount required by a mobile station receiving each the transmission signal to determine a priority of the combined code based on the transmission quality required amount, wherein a transmission error rate is taken as the transmission quality required amount.

In another preferred construction, the spread code allocation method in a CDMA cellular further comprising the step of grasping a transmission quality required amount required by a mobile station receiving each the transmission signal to determine a priority of the combined code based on the transmission quality required amount, wherein a transmission rate is taken as the transmission quality required amount.

In another preferred construction, the spread code allocation method in a CDMA cellular further comprising the step of grasping a transmission quality required amount required by a mobile station receiving each the transmission signal to determine a priority of the combined code based on the transmission quality required amount, wherein the transmission quality required amount is given by a function of a transmission rate and a transmission error rate.

In another preferred construction, the mobile station measures a channel quality value and informs the base station of the channel quality value, and the base station checks the number of uses of each second code by a combined code including the same second code and determines a priority of the combined code based on the channel quality value informed and the number of uses of each second code.

In another preferred construction, the mobile station measures a channel quality value and informs the base station of the channel quality value, the base station checks the number of uses of each second code by a combined code including the same second code and determines a priority of the combined code based on the channel quality value informed and the number of uses of each second code, and which further comprises the steps of when the channel quality value is not less than a quality threshold value, setting a priority of a combined code to be higher that includes a second code whose the number of uses of each second code by the combined code is smaller, and when the channel quality value is less than the quality threshold value, setting a priority of a combined code to be higher that includes a second code whose the number of uses of each second code by the combined code is larger.

In another preferred construction, the mobile station measures a channel quality value and informs the base station of the channel quality value, the base station checks the number of uses of each second code by a combined code including the same second code and determines a priority of the combined code based on the channel quality value informed and the number of uses of each second code, and which further comprises the step of:

setting a priority to the first code and setting a priority of each combined code in a group of combined codes including the same second code to be higher as the first code attains a higher priority.

In another preferred construction, the transmission signal includes a common control signal.

In another preferred construction, the transmission signal includes a common control signal, and to the common control signal, a combined code having he highest priority is allocated.

In another preferred construction, the spread code allocation method in a CDMA cellular further comprising the step of, at a plurality of the mobile stations, measuring a channel quality value and informing the base station of the channel quality value and at the base station, determining a priority of the combined code based on the channel quality value informed, wherein an interference signal power is taken as the channel quality value.

In another preferred construction, the spread code allocation method in a CDMA cellular further comprising the step of, at a plurality of the mobile stations, measuring a channel quality value and informing the base station of the channel quality value and at the base station, determining a priority of the combined code based on the channel quality value informed, wherein a reception power of the common control signal is taken as the channel quality value.

In another preferred construction, the spread code allocation method in a CDMA cellular further comprising the step of, at a plurality of the mobile stations, measuring a channel quality value and informing the base station of the channel quality value and at the base station, determining a priority of the combined code based on the channel quality value informed, wherein a power ratio of a desired signal to an interference signal is taken as the channel quality value.

In another preferred construction, the spread code allocation method in a CDMA cellular further comprising the step of at a plurality of the mobile stations, measuring a channel quality value and informing the base station of the channel quality value and at the base station, determining a priority of the combined code based on the channel quality value informed, wherein a power ratio of a desired signal to an interference signal is taken as the channel quality value, and further comprising the step of:

checking a reception power of a common control signal sent out from a base station that is connected to a mobile station and receiving feedback from the mobile station and a reception power of the common control signal sent out from a base station not being connected to a mobile station, i.e., no feedback is received to calculate a power ratio of a desired signal to an interference signal from a ratio of a reception power corresponding to the base station being connected to a reception power corresponding to the base station not being connected.

In another preferred construction, as the first code set, a orthogonal code is used.

In another preferred construction, as the second code set, a gold code or a part of the gold code is used.

According to another aspect of the invention, a base station in a CDMA cellular, comprises a first code set including a plurality of first codes and a second code set including one or a plurality of second codes, means for allocating the second code to the first code set and multiplying the plurality of first codes by the second code allocated to generate a plurality of combined codes, means for assigning a priority to the combined code for each transmission signal to be transmitted from a base station to a mobile station, means for allocating the combined code to the transmission signal based on the priority, and means for diffusing the transmission signal by the allocated combined code to transmit the transmission signal diffused to the mobile station.

In the preferred construction, the base station is informed of channel quality values measured at a plurality of the mobile stations to determine a priority of the combined code based on the channel quality values informed.

In another preferred construction, the base station is informed of channel quality values measured at a plurality of the mobile stations to determine a priority of the combined code based on the channel quality values informed, and sets a priority to the second code according to the channel quality value and sets a priority of the combined code to be higher as the second code attains a higher priority.

In another preferred construction, the base station is informed of channel quality values measured at a plurality of the mobile stations to determine a priority of the combined code based on the channel quality values informed, sets a priority to the second code according to the channel quality values and sets a priority of the combined code to be higher as the second code attains a higher priority, and provides an axis of a channel quality value representing the channel quality value and divides the axis of a channel quality value by a plurality of threshold values to set a channel quality value within the same value area among a plurality of value areas generated by the division by the threshold values to have the same priority of the second code.

In another preferred construction, the base station is informed of channel quality values measured at a plurality of the mobile stations and determines a priority of the combined code based on the channel quality values informed, and sets a priority to the first code according to the channel quality value and sets a priority of each combined code in a group of combined codes including the same second code to be higher as the first code attains a higher priority.

In another preferred construction, the base station is informed of channel quality values measured at a plurality of the mobile stations and determines a priority of the combined code based on the channel quality values informed, sets a priority to the first code according to the channel quality value and sets a priority of each combined code in a group of combined codes including the same second code to be higher as the first code attains a higher priority, and provides an axis of a channel quality value representing the channel quality value and divides the axis of a channel quality value by a plurality of threshold values to set a channel quality value within the same value area among a plurality of value areas generated by the division by the threshold values to have the same priority of the first code.

In another preferred construction, the base station grasps a transmission quality required amount required by a mobile station receiving each the transmission signal to determine a priority of the combined code based on the transmission quality required amount.

In another preferred construction, the base station grasps a transmission quality required amount required by a mobile station receiving each the transmission signal to determine a priority of the combined code based on the transmission quality required amount, and sets a priority to the second code according to the transmission quality required amount and sets a priority of the combined code to be higher as the second code attains a higher priority.

In another preferred construction, the base station grasps a transmission quality required amount required by a mobile station receiving each the transmission signal to determine a priority of the combined code based on the transmission quality required amount, sets a priority to the second code according to the transmission quality required amount and sets a priority of the combined code to be higher as the second code attains a higher priority, and provides an axis of a transmission quality required amount representing the transmission quality required amount and divides the axis of a transmission quality required amount by a plurality of threshold values to set a transmission quality required amount within the same value area among a plurality of value areas generated by the division by the threshold values to have the same priority of the second code.

In another preferred construction, the base station grasps a transmission quality required amount required by a mobile station receiving each the transmission signal to determine a priority of the combined code based on the transmission quality required amount, and sets a priority to the first code according to the transmission quality required amount and sets a priority of each combined code in a group of the combined codes including the same second code to be higher as the first code attains a higher priority.

In another preferred construction, the base station grasps a transmission quality required amount required by a mobile station receiving each the transmission signal to determine a priority of the combined code based on the transmission quality required amount, sets a priority to the first code according to the transmission quality required amount and sets a priority of each combined code in a group of the combined codes including the same second code to be higher as the first code attains a higher priority, and provides an axis of a transmission quality required amount representing the transmission quality required amount and divides the axis of a transmission quality required amount by a plurality of threshold values to set a transmission quality required amount within the same value area among a plurality of value areas generated by the division by the threshold values to have the same priority of the first code.

In another preferred construction, the base station is informed of a channel quality value measured at the mobile station, and checks the number of uses of each second code by a combined code including the same second code and determines a priority of the combined code based on the channel quality value informed and the number of uses of each second code.

In another preferred construction, the base station is informed of a channel quality value measured at the mobile station, checks the number of uses of each second code by a combined code including the same second code and determines a priority of the combined code based on the channel quality value informed and the number of uses of each second code, when the channel quality value is not less than a quality threshold value, sets a priority of a combined code to be higher that includes a second code whose the number of uses of each second code by the combined code is smaller, and when the channel quality value is less than the quality threshold value, sets a priority of a combined code to be higher that includes a second code whose the number of uses of each second code by the combined code is larger.

In another preferred construction, the base station is informed of a channel quality value measured at the mobile station, checks the number of uses of each second code by a combined code including the same second code and determines a priority of the combined code based on the channel quality value informed and the number of uses of each second code, and sets a priority to the first code and sets a priority of each combined code in a group of combined codes including the same second code to be higher as the first code attains a higher priority.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a diagram showing a first priority setting example in the combined code allocation according to the first embodiment of the present invention;

FIG. 5 is a diagram showing a first priority setting example in the combined code allocation according to the first embodiment of the present invention;

FIG. 7 is a diagram showing a second priority setting example in the combined code allocation according to the first embodiment of the present invention;

FIG. 8 is a diagram showing a second priority setting example in the combined code allocation according to the first embodiment of the present invention;

FIG. 10 is a diagram showing a third priority setting example in the combined code allocation according to the first embodiment of the present invention;

FIG. 11 is a diagram showing a third priority setting example in the combined code allocation according to the first embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the present invention, a priority is given to a spreading code generated by multiplying a scramble code and a orthogonal code and the priority is changed according to a required quality and a reception quality of a mobile station.

Then, by changing a priority of a spreading code according to a required quality and a reception quality, the present invention controls interference between mobile stations having different required qualities and reception qualities to alleviate inequality in signal reception qualities at the mobile stations, thereby suppressing degradation caused by interference derived from inequality.

[Description of Structure]

In a spread code allocation method according to a first embodiment of the present invention, a first code set including a plurality of first codes and a second code set including one or a plurality of second codes are provided. Here, the first code corresponds to a orthogonal code and the second code corresponds to a scramble code. As a scramble code, a gold code, a part of the gold code or the like can be used.

Then, allocate the second code to the first code set and multiply the plurality of first codes by the allocated second code to generate a plurality of combined codes. When the combined codes are generated, allocate the combined codes to transmission signals to be transmitted from a base station to a mobile station, diffuse the transmission signals according to the allocated combined codes and transmit the diffused transmission signals to the mobile station.

In the present invention, a combined code is assigned a priority. Then, a combined code having a higher priority is given preference for allocation to transmission signals. The priority can be changed for each transmission signal. More specifically, the priority for each transmission signal is changed based on channel quality value information and required quality value information from a mobile station.

In the following, a first embodiment in which the spread code allocation method of the present invention is applied to a base station transmission device will be described with reference to FIGS. 1 and 2.

Figure 1:
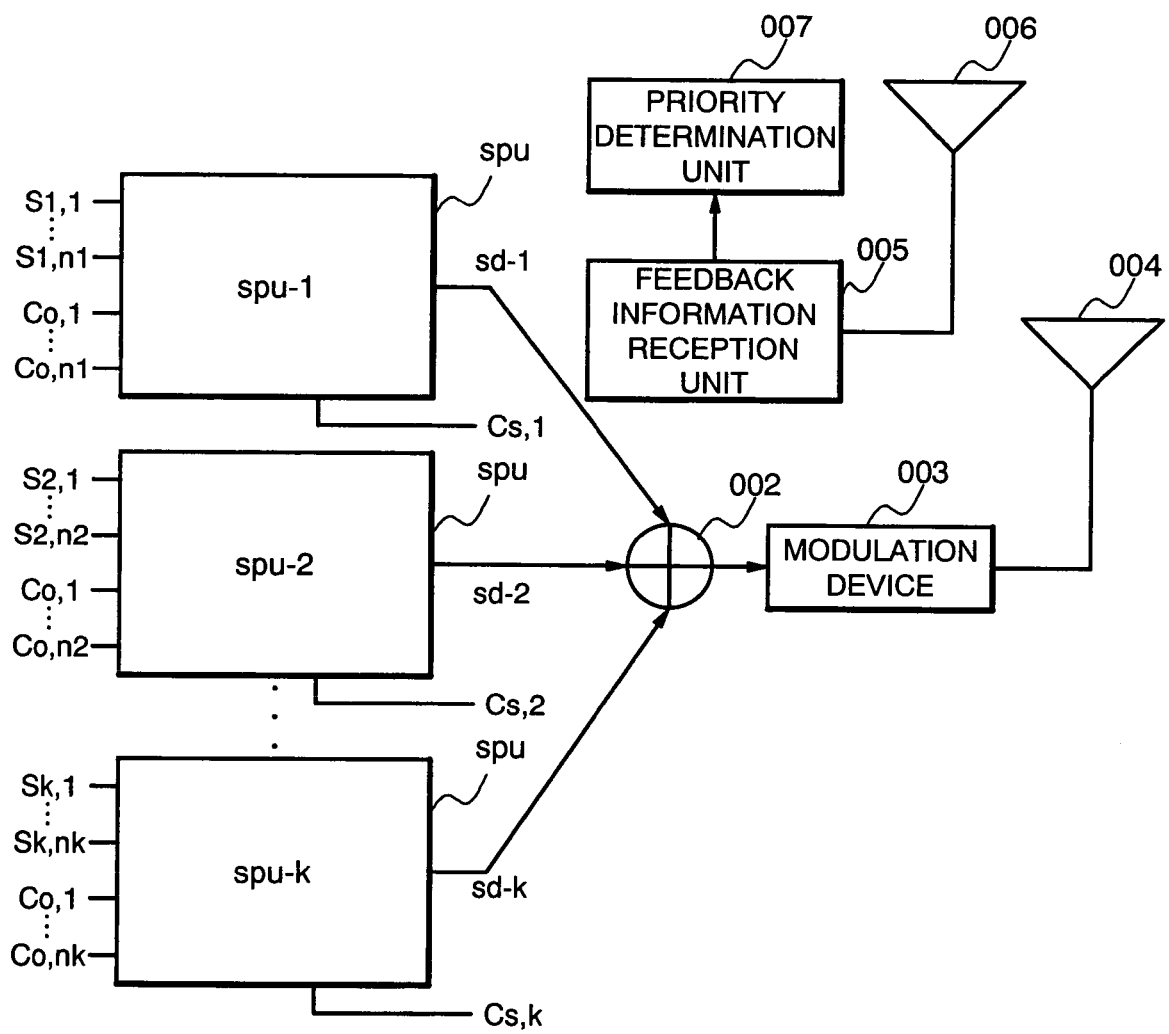
FIG. 1 is a block diagram showing a base station device to which a spread code allocation method of the present invention is applied.

FIG. 1 is a diagram showing a structure of a base station transmission device in a case where a number k of scramble codes are used.

The first embodiment of the present invention includes a spreading addition device spu-j (j: scramble code number), an adder 002, a modulation device 003 and an antenna 004.

The spreading addition device spu-j allocates a combined code of a orthogonal code Co, h and a scramble, code Cs, j to a transmission signal Sj, h (h: orthogonal code number) to output a composite spreading signal sd-j. nj in FIG. 1 denotes the number of uses of a orthogonal code generated by a j-th scramble code. Here, transmission signals may include a common control signal.

The adder 002 adds each output sd-j of a composite spreading signal.

The modulation device 003 modulates composite spreading signals added at the adder 002.

The antenna 004 sends out a composite spreading signal modulated at the modulation device 003 to each mobile station.

A feedback information reception unit 005 receives channel quality information and required quality information as feedback information from a mobile station through an antenna 006.

A priority determination unit 007 receives feedback information from the feedback information reception unit 005 to determine a priority of a combined code for each transmission signal based on the information.

[Description of Operation]

Next, operation of the present embodiment will be described with reference to FIGS. 1 and 2.

Figure 2:
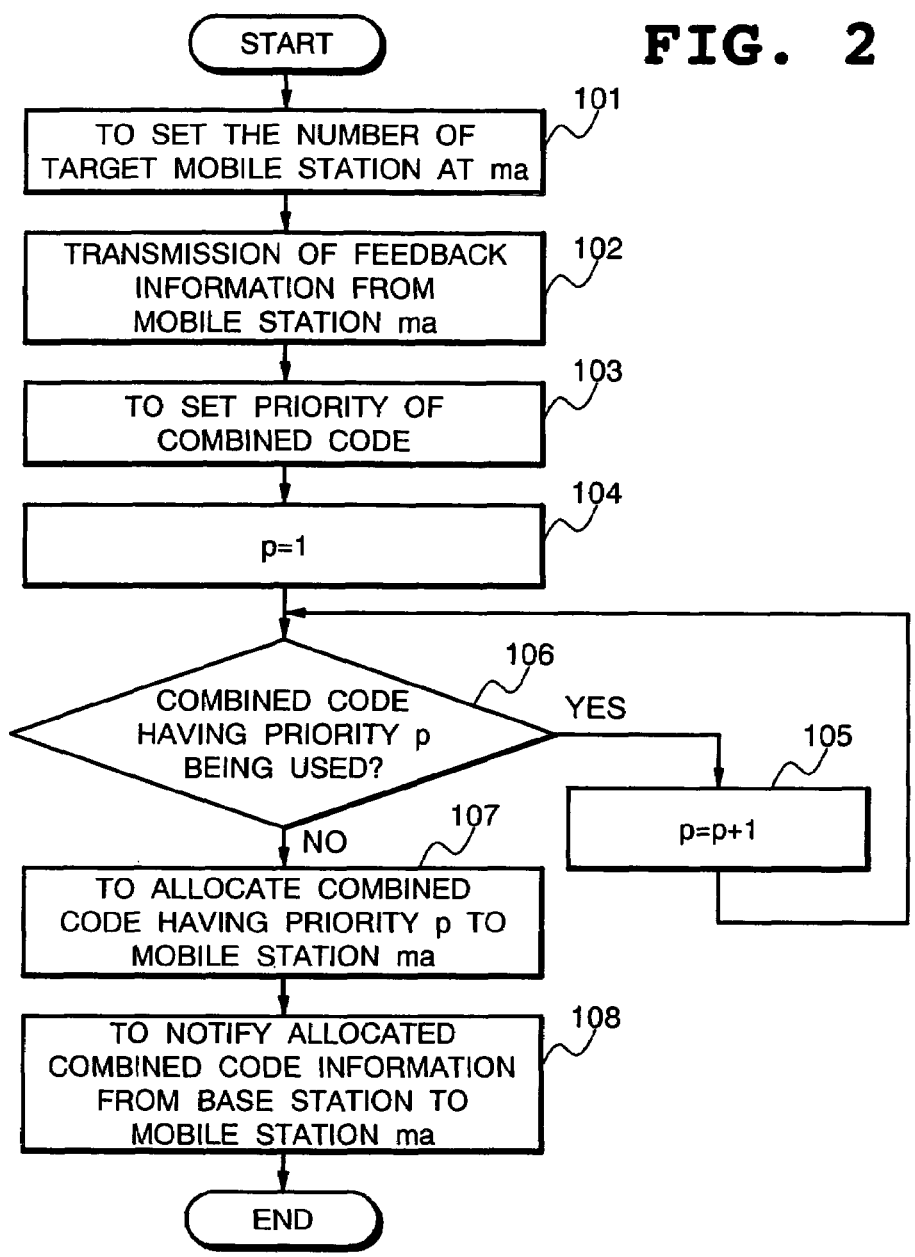
FIG. 2 is a flow chart of code allocation processing showing a first embodiment of the present invention.

FIG. 2 shows a flow chart of allocation processing at a base station conducted at the time of allocating a combined code made up of a orthogonal code and a scramble code to a mobile station.

At the processing 101, the base station sets, at a variable ma, the number of a mobile station to which a code is to be allocated. At the processing 102, receive transmission of feedback information from the mobile station ma. Applied here as the feedback information are channel quality value information such as a reception power of a common control signal and a power ratio of a desired signal to an interference signal and required quality value information such as a transmission rate and a required error rate.

In a case where as a channel quality value, a power ratio of a desired signal to an interference signal is adopted here, the power ratio in question can be calculated by checking a reception power of a common control signal sent out from a base station that is connected to a mobile station and receiving feedback from the mobile station and checking a reception power of a common control signal sent out from off a base station not being connected to a mobile station, i.e., no feedback is received to take a ratio of a reception power corresponding to the base station being connected to a reception power corresponding to the base station not being connected.

At the processing 103, set a priority of a combined code based on the feedback information and further at the processing 104, set a priority variable p to be 1, that is, to be a highest priority. At the processing 106, determine whether the combined code having the priority p is being used or not and when the combined code of the priority p is in use, add 1 to the priority variable p at the processing 105 to return to the processing 106.

When the determination is made at the processing 106 that the combined code having the priority p is not in use, allocate the combined code of the priority p to the mobile station ma at the processing 107 and notify the allocated combined code information from the base station to the mobile station ma to complete the code allocation processing.

A transmission signal to be transmitted from the base station to the mobile station using an allocated code may include a common control signal and in this case, the common control signal is preferably allocated a combined code whose priority is the highest.

[First Examples of Priority Setting]

Figure 3:
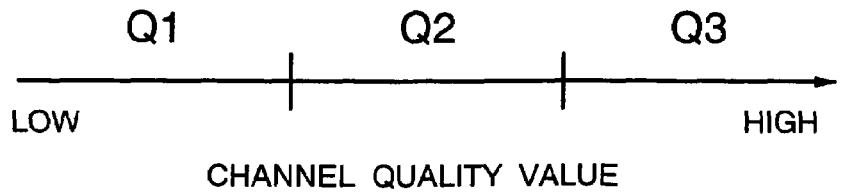
FIG. 3 is a diagram showing one example of a relationship between a channel quality value and channel quality value classification in a first priority setting example in the combined code allocation according to the first embodiment of the present invention.

FIGS. 3, 4 and 5 show examples of setting of a priority of each combined code conducted at the priority determination unit 007 at the processing 103 of FIG. 2 according to the first embodiment of the present invention. In this example, priority is set based on a channel quality value.

The abscissa of FIG. 3 represents a channel quality value observed by a mobile station and the channel quality values are divided by several threshold values as shown in FIG. 3. Among possible channel quality values are an interference power observed at the mobile station, a reception power of a common control signal received by the mobile station and a power ratio of a desire signal to an interference signal. These channel quality values measured by the mobile station are transmitted to the base station at the processing 102 of FIG. 2.

As illustrated in FIG. 3, to a plurality of value areas divided by the threshold values, channel quality value class are set. As a result, to approximately the same channel quality value, an equal channel quality value class is applied. According to a channel quality value observed at the mobile station, a channel quality value class is selected from FIG. 3.

At the base station, the priority determination unit 007 determines a priority of a combined code based on the channel quality values, more specifically, for each channel quality value class. At that time, the unit 007 determines the priority of the combined code by assigning a priority to a scramble code as a second code or a priority to a first code which is a orthogonal code and a second code. At that time, for each channel quality value class, set the priority of the scramble code or the priorities of the scramble code and the orthogonal code to be the same.

FIGS. 4 and 5 show examples of setting of a priority of each combined code in the channel quality value classes Q1 and Q2. The abscissa in each table shown in FIGS. 4(*a*) and (*b*) and 5(*a*) and (*b*) represents the number of a scramble code and the ordinate represents the number of a orthogonal code and each element in the tables represents a priority of each combined code.

In the example of FIG. 4, the scramble codes are given priorities which are changed according to channel quality values. In FIG. 4(*a*), the priority of the scramble code 1 is set to be 1 and the priority of the scramble code 2 is set to be 2, while in FIG. 4(*b*), the priority of the scramble code 1 is set to be 2 and the priority of the scramble code 2 set to be 1. Then, the higher the priority of a scramble code is, the higher the priority of a combined code is set to be.

As a result, a group of combined codes including the scramble code 1 in FIG. 4(*a*) is assigned the priorities 1 to 8, a group of combined codes including the scramble code 2 in FIG. 4(*a*) is assigned the priorities 9 to 16, a group of combined codes including the scramble code 1 in FIG. 4(*b*) is assigned the priorities 9 to 16, and a group of combined codes including the scramble code 2 in FIG. 4(*b*) is assigned the priorities 1 to 8. In this example, no orthogonal code is assigned a priority and to each scramble code, a orthogonal code is assigned at random.

In the example of FIG. 5, similarly to the example of FIG. 4, the scramble codes are given priorities which are changed according to channel quality values. In FIG. 5(*a*), the priority of the scramble code 1 is set to be 1 and the priority of the scramble code 2 is set to be 2, while in FIG. 5(*b*), the priority of the scramble code 1 is set to be 2 and the priority of the scramble code 2 is set to be 1. Then, the higher the priority of a scramble code is, the higher the priority of a combined code is set to be.

As a result, a group of combined codes including the scramble code 1 in FIG. 5(*a*) is assigned the priorities 1 to 8, a group of combined codes including the scramble code 2 in FIG. 5(*a*) is assigned the priorities 9 to 16, a group of combined codes including the scramble code 1 in FIG. 5(*b*) is assigned the priorities 9 to 16, and a group of combined codes including the scramble code 2 in FIG. 5(*b*) is assigned the priorities 1 to 8.

Furthermore, in this example, a orthogonal code is assigned a priority. More specifically, in FIGS. 5(*a*) and (*b*), the orthogonal codes 1, 2, . . . , 8 are assigned orthogonal code priorities 1, 2, . . . 8, respectively. Then, the higher the priority of the orthogonal code is, the higher the priority of the combined code is set to be.

More specifically, the priorities of the group of combined codes including the scramble code 1 in FIG. 5(*a*) are set to be 1, 2, . . . , 8 for the combined codes (1, 1), (1, 2) . . . (1, 8)(scramble code number, orthogonal code number), respectively. Priorities of the group of combined codes including the scramble code 2 are set to be 9, 10, . . . , 16 for the combined codes (2, 1), (2, 2) . . . (2, 8), respectively. Also, priorities of the group of combined codes including the scramble code 1 in FIG. 5(b) are set to be 9, 10, . . . , 16 for the combined codes (1, 1), (1, 2) . . . (1, 8), respectively. Priorities of the group of combined codes including the scramble code 2 are set to be 1, 2, . . . , 8 for the combined codes (2, 1), (2, 2) . . . (2, 8), respectively.

Although in the examples of FIGS. 5(a) and (b), priorities of the orthogonal codes are uniformly determined, they may be changed according to channel quality values similarly to the scramble codes.

[Effect]

When transmission power control on a downlink is applied, transmission power directed to each mobile station changes with a channel quality, and difference in transmission power causes inequality in the amount of interference from other downward transmission signals received by each mobile station. According to the present embodiment, priority of a combined code is changed with a channel quality value class and allocation of a transmission signal and a combined code is classified according to a channel quality as shown in FIGS. 4 and 5. As a result, inequality of a call reception quality at each mobile station derived from a difference in a channel quality is suppressed.

When common control signal reception power is used as a channel quality value, in particular, the following interference reduction effect can be expected.

According to the present embodiment shown in FIGS. 3, 4 and 5, equal scramble codes are assigned to a mobile station having approximately the same common control signal reception power, that is, to a mobile station having approximately the same propagation loss between a base station and a mobile station. Between transmission signals allocated the same scramble code, interference therebetween is reduced because the same orthogonal code set is assigned.

In a case where transmission power control is conducted, a transmission signal directed to a mobile station having a low common control signal reception power, that is, a transmission signal directed to a mobile station having a large loss of propagation up to the base station, is discharged from the base station with a large output which will cause large interference to other radio lines. According to the present embodiment shown in FIGS. 3, 4 and 5, since the transmission signals in question are assigned a combined code including the same orthogonal code set, interference between the transmission signals in question can be suppressed.

On the other hand, to a transmission signal directed to a mobile station having a high common control signal reception power, that is, to a transmission signal directed to a mobile station having a small loss of propagation up to the base station, a transmission power for compensating for a propagation loss can be set to be small. Thus, it is possible to set, at a transmission signal having a margin for transmission power setting, a transmission power high enough to overcome large interference received from a transmission signal directed to a mobile station whose common control signal reception power is small, so that reduction in interference is expected.

[Second Example of Priority Setting]

Figure 6:
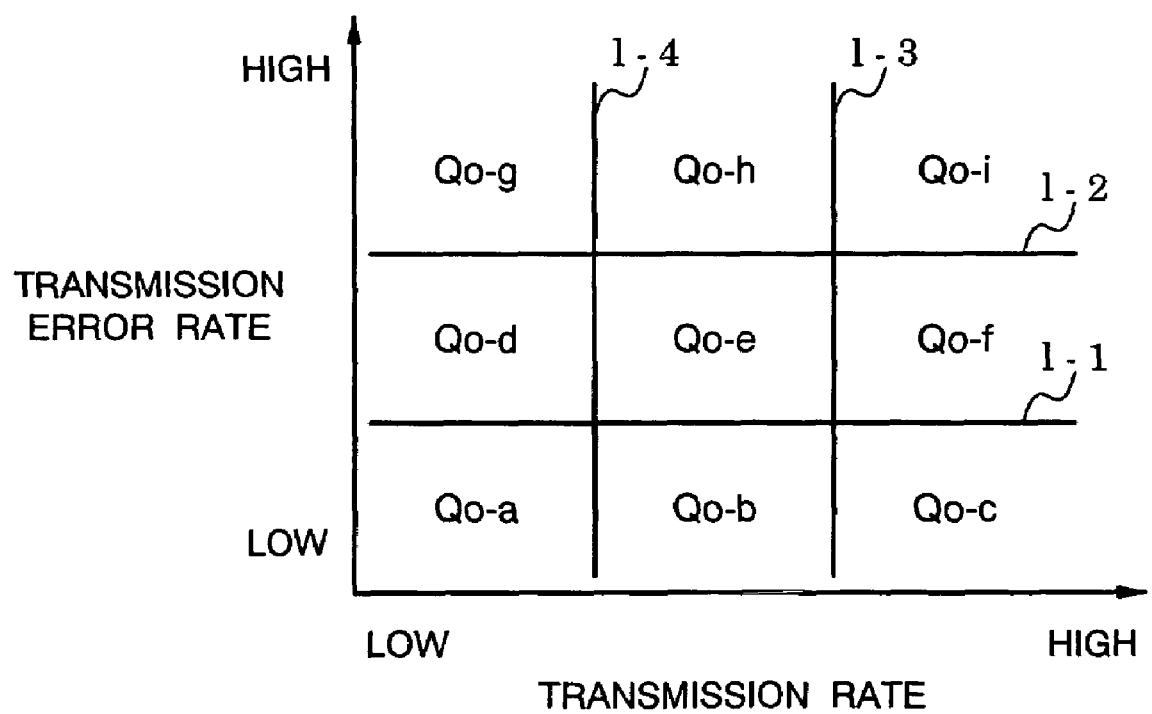
FIG. 6 is a diagram showing one example of classification of transmission quality required amounts with respect to a transmission rate and a transmission error rate in a second priority setting example in the combined code allocation according to the first embodiment of the present invention.

FIG. 6 shows second example of setting of a priority of each combined code conducted at the priority determination unit 007 of the base station at the processing 102 of FIG. 1 according to the first embodiment of the present invention. In this example, priority is set based on a transmission quality required amount. Possible transmission quality required amount includes a transmission rate, a transmission error rate, a function of a transmission rate and a transmission error rate.

The abscissa and ordinate of FIG. 6 represent a transmission rate and a transmission error rate required by a mobile station, respectively. 1-1, 1-2, 1-3 and 1-4 in FIG. 6 are boundary lines for defining transmission quality required amount classes Qo-a to Qo-i. These transmission quality required amounts required by the mobile station are transmitted to the base station at the processing 102 of FIG. 2. In FIG. 6, to approximately the same transmission rate and transmission error rate, equal transmission quality required amount class is applied.

Based on a transmission quality required amount requested by the mobile station and according to a transmission rate of a transmission signal and a transmission error rate required of the transmission signal in question, a transmission quality required amount class is selected from FIG. 6.

At the base station, the priority determination unit 007 determines a priority of a combined code based on the transmission quality required amounts, more specifically, for each transmission quality required amount class. At that time, the unit 007 determines the priority of the combined code by assigning a priority to a scramble code as a second code or priority to a first code which is a orthogonal code and a second code. At that time, for each transmission quality required amount class, set the priority of the scramble code or the priorities of the scramble code and the orthogonal code to be the same.

FIGS. 7 and 8 show examples of setting of a priority of each combined code in the transmission quality required amount classes Qo-a and Qo-b. The abscissa in each table shown in FIGS. 7(a) and (b) and 8(a) and (b) represents the number of a scramble code and the ordinate represents the number of a orthogonal code and each element in the tables represents a priority of each combined code.

The transmission quality required amount class Qo-b is premised on transmission faster than that of Qo-a, in which an amount occupied by codes per call is set to be larger than that of Qo-a. As a code generation method realizing such high-speed transmission, well known is a method using a plurality of orthogonal codes simultaneously and a method using a hierarchical orthogonal code.

In the example of FIG. 7, the scramble codes are given priorities which are changed according to a transmission quality required amount. In FIG. 7(a), the priority of the scramble code 1 is set to be 1 and the priority of the scramble code 2 is set to be 2, while in FIG. 7(b), the priority of the scramble code 1 is set to be 2 and the priority of the scramble code 2 set to be 1. Then, the higher the priority of a scramble code is, the higher the priority of a combined code is set to be.

As a result, a group of combined codes including the scramble code 1 in FIG. 7(a) is assigned the priorities 1 to 8, a group of combined codes including the scramble code 2 in FIG. 7(a) is assigned the priorities 9 to 16, a group of combined codes including the scramble code 1 in FIG. 7(b) is assigned the priorities 5 to 8 and a group of combined codes including the scramble code 2 in FIG. 7(b) is assigned the priorities 1 to 4. In this example, no orthogonal code is assigned a priority and to each scramble code, a orthogonal code is assigned at random.

In the example of FIG. 8, similarly to the example of FIG. 7, the scramble codes are given priorities which are changed according to a transmission quality required amount. In FIG. 8(a), the priority of the scramble code 1 is set to be 1 and the priority of the scramble code 2 is set to be 2, while in FIG. 8(b), the priority of the scramble code 1 is set to be 2 and the priority of the scramble code 2 is set to be 1. Then, the higher the priority of a scramble code is, the higher the priority of a combined code is set to be.

As a result, a group of combined codes including the scramble code 1 in FIG. 8(a) is assigned the priorities 1 to 8, a group of combined codes including the scramble code 2 in FIG. 8(a) is assigned priorities 9 to 16, a group of combined codes including the scramble code 1 in FIG. 8(b) is assigned the priorities 5 to 8 and a group of combined codes including the scramble code 2 in FIG. 8(b) is assigned the priorities 1 to 4.

Furthermore, in this example, a orthogonal code is assigned a priority. More specifically, in FIG. 8(a), the orthogonal codes 1, 2, . . . , 8 are assigned orthogonal code priorities 1, 2, . . . 8, respectively. In FIG. 8(b), the orthogonal codes 1 and 2, 3 and 4, 5 and 6, and 7 and 8 are assigned orthogonal code priorities 1, 2, 3 and 4, respectively.

Then, the higher the priority of the orthogonal code is, the higher the priority of the combined code is set to be. More specifically, the priorities of the group of combined codes including the scramble code 1 in FIG. 8(a) are set to be 1, 2, . . . , 8 for the combined codes (1, 1), (1, 2) . . . (1, 8) (scramble code number, orthogonal code number), respectively. Priorities of the group of combined codes including the scramble code 2 are set to be 9, 10, . . . , 16 for the combined codes (2, 1), (2, 2) . . . (2, 8), respectively.

Also, priorities of the group of combined codes including the scramble code 1 in FIG. 8(b) are set to be 5, 6, 7 and 8 for the combined codes (1, 1&2), (1, 3&4), (1, 5&6) and (1, 7&8), respectively. Priorities of the group of combined codes including the scramble code 2 are set to be 1, 2, 3 and 4 for the combined codes (2, 1&2), (2, 3&4), (2, 5&6) and (2, 7&8), respectively.

Here, the combined code (A, B&C) indicates that orthogonal codes B and C are simultaneously used for the scramble code A.

[Effect]

As described in FIGS. 6, 7 and 8, in the present embodiment, a priority of a combined code is changed according to a transmission quality required amount class. Thus changing a priority of a combined code according to a transmission quality required amount given by a transmission rate, a transmission error rate, etc., allocation of transmission signals and combined codes is classified according to a transmission rate and a transmission error rate.

In general, the higher a transmission speed of a transmission signal is, or the lower an error rate required by a transmission signal is, the more power the transmission needs. By allocating an equal scramble code to these transmission signals which can exert large interference to other signals, interference between the relevant transmission signals can be suppressed.

On the other hand, although a transmission signal allowing low-speed transmission or a high error rate receives large interference from a transmission signal which is assigned a different scramble code and requires high-speed transmission or a low error rate, because required transmission power of the transmission signal allowing low-speed transmission or a high error rate is low, application of transmission power control overcomes the large interference. In addition, assigning a scramble code according to a transmission rate or an error rate enables suppression of inequality in received call quality.

[Third Example of Priority Setting]

Figure 9:
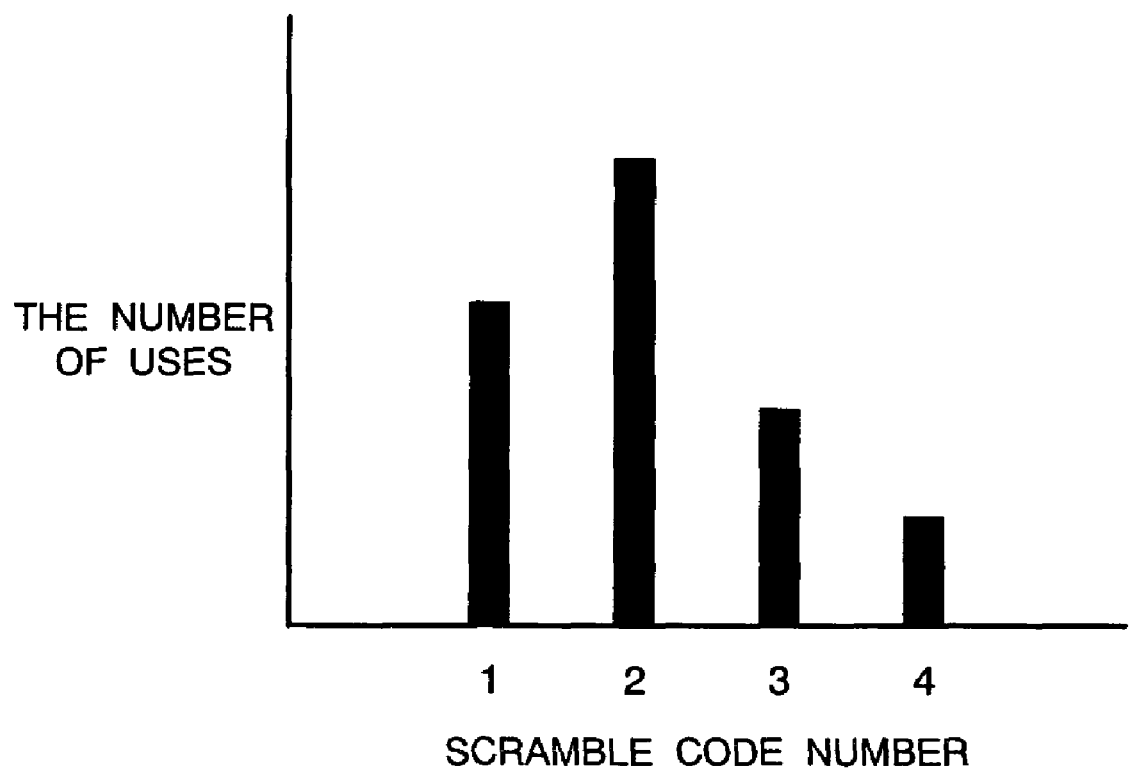
FIG. 9 is a diagram showing the number of uses of a scramble code in a third priority setting example in the combined code allocation according to the first embodiment of the present invention.
Figure 12:
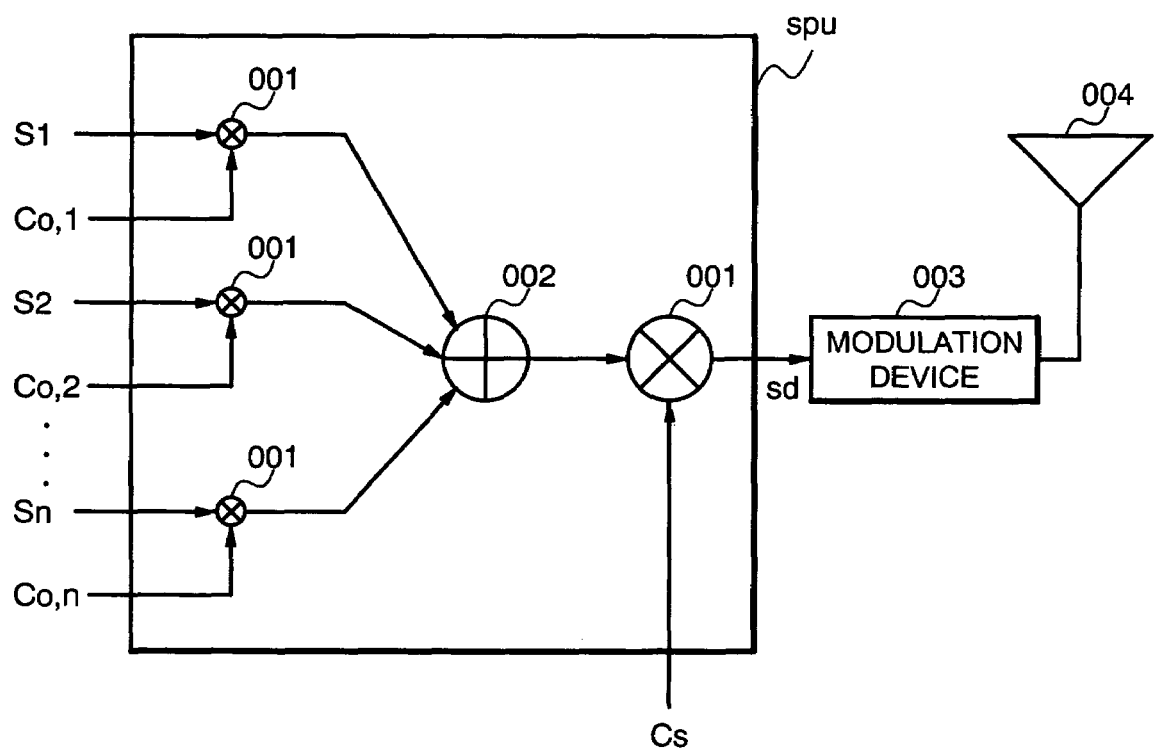
FIG. 12 is a diagram showing a structure of a base station transmission device using conventional singular scramble code spreading.
Figure 13:
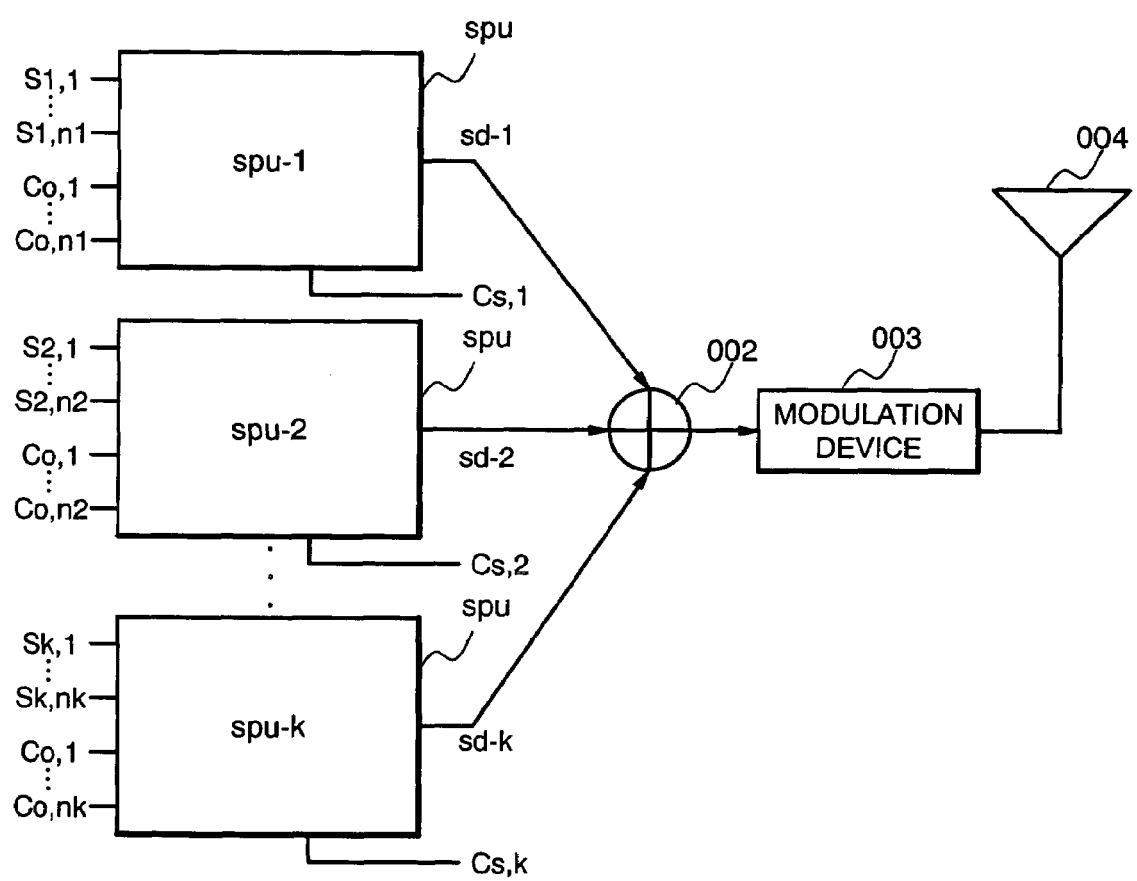
FIG. 13 is a diagram showing a structure of a base station transmission device using conventional plural scramble codes spreading.

FIGS. 9, 10 and 11 show a third example of setting of a priority of each combined code conducted at the priority determination unit 007 of the base station at the processing 102 of FIG. 1 according to the first embodiment of the present invention. In this example, priority is set based on a channel quality value and the number of uses of a second code.

First, the base station checks the number of uses of each scramble code by a combined code in advance. FIG. 9 shows one example of the result, in which the abscissa represents the number of a scramble code and the ordinate represents the number of uses of each scramble code. FIG. 9 is premised on that the second scramble code is most frequently used and the fourth scramble code is least frequently used.

The base station determines a priority of a combined code based on the number of uses of the relevant scramble code and a channel quality value transmitted from a mobile station. Here, as channel quality values, interference power observed at the mobile station, a common control signal reception power at the mobile station and a power ratio of a desired signal to an interference signal are applied and the channel quality value information is transmitted from the mobile station to the base station at the processing 108 in FIG. 1.

FIGS. 10 and 11 show examples of setting of a priority of each combined code under the condition of the number of uses of a scramble code given in FIG. 9. In each table, the ordinate represents the number of a orthogonal code and the abscissa represents the number of a scramble code.

In the example of FIG. 10, when the channel quality value transmitted from the mobile station is not less than a quality threshold value, set the highest priority to a scramble code which is least frequently used under the given condition of the number of uses of a scramble code as shown in FIG. 10(a).

More specifically, set the priority of the scramble code 4 to be 1, that of the scramble code 3 to be 2, that of the scramble code 1 to be 3 and that of the scramble code 2 to be 4. Then, the higher the priority of the scramble code is, the higher the priority of a combined code is set to be. As a result, to a group of combined codes including the scramble code 1 in FIG. 10(a), priorities 17 to 24 are allocated, to a group of combined codes including the scramble code 2, priorities 25 to 32 are allocated, to a group of combined codes including the scramble code 3, priorities 9 to 16 are allocated and to a group of combined codes including the scramble code 4, priorities 1 to 8 are allocated.

On the other hand, when the channel quality value transmitted from the mobile station is less than the quality threshold value, set the highest priority to a scramble code which is most frequently used under the given condition of the number of uses of a scramble code as shown in FIG. 10(b).

More specifically, set the priority of the scramble code 2 to be 1, that of the scramble code 1 to be 2, that of the scramble code 3 to be 3 and that of the scramble code 4 to be 4. Then, the higher the priority of the scramble code is, the higher the priority of a combined code is set to be. As a result, to a group of combined codes including the scramble code 1 iii FIG. 10(b), priorities 9 to 16 are allocated, to a group of combined codes including the scramble code 2, priorities 1 to 8 are allocated, to a group of combined codes including the scramble code 3, priorities 17 to 24 are allocated and to a group of combined codes including the scramble code 4, priorities 25 to 32 are allocated.

In this example, no priority is assigned to a orthogonal code and for each scramble code, a orthogonal code is allocated at random.

In the example of FIG. 11, similarly to the case of FIG. 10, when the channel quality value transmitted from the mobile station is not less than a quality threshold value, set the highest priority to a scramble code which is least frequently used under the given condition of the number of uses of a scramble code as shown in FIG. 11(a).

More specifically, set the priority of the scramble code 4 to be 1, that of the scramble code 3 to be 2, that of the scramble code 1 to be 3 and that of the scramble code 2 to be 4. Then, the higher the priority of the scramble code is, the higher the priority of a combined code is set to be. As a result, to a group of combined codes including the scramble code 1 in FIG. 11(a), priorities 17 to 24 are allocated, to a group of combined codes including the scramble code 2, priorities 25 to 32 are allocated, to a group of combined codes including the scramble code 3, priorities 9 to 16 are allocated and to a group of combined codes including the scramble code 4, priorities 1 to 8 are allocated.

On the other hand, when the channel quality value transmitted from the mobile station is less than the quality threshold value, set the highest priority to a scramble code which is most frequently used under the given condition of the number of uses of a scramble code as shown in FIG. 11(b).

More specifically, set the priority of the scramble code 2 to be 1, that of the scramble code 1 to be 2, that of the scramble code 3 to be 3 and that of the scramble code 4 to be 4. Then, the higher the priority of the scramble code is, the higher the priority of a combined code is set to be. As a result, to a group of combined codes including the scramble code 1 in FIG. 11(b), priorities 9 to 16 are allocated, to a group of combined codes including the scramble code 2, priorities 1 to 8 are allocated, to a group of combined codes including the scramble code 3, priorities 17 to 24 are allocated and to a group of combined codes including the scramble code 4, priorities 25 to 32 are allocated.

In the example of FIG. 11, priority is allocated also to a orthogonal code. More specifically, priorities of the orthogonal codes 1, 2, ..., 8 are set to be 1, 2, ... 8, respectively. Then, the higher the priority of a orthogonal code is, the higher the priority of a combined code is set to be.

More specifically, priorities of a group of combined codes including the scramble code 1 in FIG. 11(a) are set to be 17, 18, ..., 24 for combined codes (1, 1), (1, 2) ... (1, 8) (scramble code number, orthogonal code number), respectively, priorities of a group of combined codes including the scramble code 2 are set to be 25, 26, ..., 32 for combined codes (2, 1), (2, 2) ... (2, 8), priorities of a group of combined codes including the scramble code 3 are set to be 9, 10, ..., 16 for combined codes (3, 1), (3, 2) ..., (3, 8) and priorities of a group of combined codes including the scramble code 4 are set to be 1, 2, ..., 8 for combined codes (4, 1), (4, 2) ... (4, 8).

Also, priorities of a group of combined codes including the scramble code 1 in FIG. 11(b) are set to be 9, 10, ..., 16 for combined codes (1, 1), (1, 2) (1, 8), respectively, priorities of a group of combined codes including the scramble code 2 are set to be 1, 2, ..., 8 for combined codes (2, 1), (2, 2) ... (2, 8), priorities of a group of combined codes including the scramble code 3 are set to be 17, 18, ..., 24 for combined codes (3, 1), (3, 2) ..., (3, 8) and priorities of a group of combined codes including the scramble code 4 are set to be 25, 26, ..., 32 for combined codes (4, 1), (4, 2) ... (4, 8).

Although in the examples of FIGS. 11(a) and (b), priority of a orthogonal code is uniformly determined, it may be changed according to the number of uses of each orthogonal code by a combined code similarly to a case of a scramble code.

[Effect]

Between signals allocated different scramble codes, the amount of interference therebetween is large because orthogonality of the codes can not be maintained. A transmission signal allocated a scramble code which is less frequently used, in particular, receives large interference from a transmission signal allocated a scramble signal whose frequency of use is high.

In a case where transmission power control is applied, when a channel quality value is a quality threshold value, that is, when reception quality at a mobile station is excellent, transmission power directed to the mobile station in question can be set low. In this case, as shown in FIGS. 9, 10 and 11, even if a combined code including a scramble code whose frequency of use is low is allocated to the mobile station having a high channel quality value, a transmission signal directed to the mobile station in question is allowed to endure interference without reaching its maximum transmission power. As a result, degradation due to interference can be suppressed.

Although the foregoing description has been made of an application of the spread code allocation method of the present invention to a base station device as an example, it is clearly understood that the method can be realized not only at a base station device but also at a control station and an exchange.

As described in the foregoing, according to the present invention, by changing a priority of a spreading code according to required quality or reception quality at a mobile station, inequality of call reception quality at the mobile stations can be suppressed to reduce interference.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A spread code allocation method in a CDMA cellular network, comprising the steps of:
   having a first code set including a plurality of first codes and a second code set including one or a plurality of second codes,
   allocating the second code to said first code set and multiplying said plurality of first codes by said second codes allocated to generate a plurality of combined codes,
   assigning a priority to each of said combined codes,
   allocating said combined code to said transmission signal based on said priority for each transmission signal to be transmitted from a base station to a mobile station, and spreading said transmission signal by the assigned combined code to transmit said transmission signal to said mobile station, wherein determining a priority of said combined code for each transmission signal is based on a channel quality value measured by said mobile station.

2. The spread code allocation method in a CDMA cellular network as set forth in claim 1, further comprising the step of, at a plurality of said mobile stations, measuring a channel quality value and informing said base station of said channel quality value and at said base station, determining a priority of said combined code based on said channel quality value informed.

3. The spread code allocation method in a CDMA cellular network as set forth in claim 1, further comprising the steps of:

at a plurality of said mobile stations, measuring a channel quality value and informing said base station of said channel quality value and at said base station, determining a priority of said combined code based on said channel quality value informed, and setting a priority to said second code according to said channel quality value and setting a priority of said combined code to be higher as said second code attains a higher priority.

4. The spread code allocation method in a CDMA cellular network as set forth in claim 1, further comprising the steps of:

at a plurality of said mobile stations, measuring a channel quality value and informing said base station of said channel quality value and at said base station, determining a priority of said combined code based on said channel quality value informed, setting a priority to said second code according to said channel quality value and setting a priority of said combined code to be higher as said second code attains a higher priority, and providing the axis of a channel quality value representing said channel quality value and dividing the axis of a channel quality value by a plurality of threshold values to set a channel quality value within the same value area among a plurality of value areas generated by the division by said threshold values to have the same priority of said second code.

5. The spread code allocation method in a CDMA cellular network as set forth in claim 1, further comprising the steps of:

at a plurality of said mobile stations, measuring a channel quality value and informing said base station of said channel quality value and at said base station, determining a priority of said combined code based on said channel quality value informed, and setting a priority to said first code and setting a priority of each combined code in a group of combined codes including the same second code to be higher as said first code attains a higher priority.

6. The spread code allocation method in a CDMA cellular network as set forth in claim 1, further comprising the steps of:

at a plurality of said mobile stations, measuring a channel quality value and informing said base station of said channel quality value and at said base station, determining a priority of said combined code based on said channel quality value informed, setting a priority to said first code and setting a priority of each combined code in a group of combined codes including the same second code to be higher as said first code attains a higher priority, and providing an axis of a channel quality value representing said channel quality value and dividing the axis of a channel quality value by a plurality of threshold values to set a channel quality value within the same value area among a plurality of value areas generated by the division by said threshold values to have the same priority of said first code.

7. The spread code allocation method in a CDMA cellular network as set forth in claim 1, wherein said mobile station measures a channel quality value and informs said base station of said channel quality value, and said base station checks the number of times each second code is used by a combined code including the same second code and determines a priority of said combined code based on said channel quality value informed and said number of uses of each second code.

8. The spread code allocation method in a CDMA cellular network as set forth in claim 1, wherein said mobile station measures a channel quality value and informs said base station of said channel quality value, said base station checks the number of uses of each second code by a combined code including the same second code and determines a priority of said combined code based on said channel quality value informed and said number of uses of each second code, and which further comprises the steps of:

when said channel quality value is not less than a quality threshold value, setting a higher priority of a combined code that includes a second code whose said number of uses of each second code by said combined code is smaller, and when said channel quality value is less than said quality threshold value, setting a priority of a combined code to be higher that includes a second code whose said number of uses of each second code by said combined code is larger.

9. The spread code allocation method in a CDMA cellular network as set forth in claim 1, wherein said mobile station measures a channel quality value and informs said base station of said channel quality value, said base station checks the number of uses of each second code by a combined code including the same second code and determines a priority of said combined code based on said channel quality value informed and said number of uses of each second code, and which further comprises the step of:

setting a priority to said first code and setting a priority of each combined code in a group of combined codes including the same second code to be higher as said first code attains a higher priority.

10. The spread code allocation method in a CDMA cellular network as set forth in claim 1, wherein said transmission signal includes a common control signal.

11. The spread code allocation method in a CDMA cellular network as set forth in claim 1, wherein said transmission signal includes a common control signal, and to said common control signal, a combined code having he highest priority is allocated.

12. The spread code allocation method in a CDMA cellular network as set forth in claim 1, further comprising the step of, at a plurality of said mobile stations, measuring a channel quality value and informing said base station of said channel quality value and at said base station, determining a priority of said combined code based on said channel quality value informed, wherein an interference signal power is taken as said channel quality value.

13. The spread code allocation method in a CDMA cellular network as set forth in claim 1, further comprising the step of, at a plurality of said mobile stations, measuring a channel quality value and informing said base station of said channel quality value and at said base station, determining a priority of said combined code based on said channel quality value informed, wherein a reception power of said common control signal is taken as said channel quality value.

14. The spread code allocation method in a CDMA cellular network as set forth in claim 1, further comprising the step of, at a plurality of said mobile stations, measuring a channel quality value and informing said base station of said channel quality value and at said base station, determining a priority of said combined code based on said channel quality value informed, wherein a power ratio of a desired signal to an interference signal is taken as said channel quality value.

15. The spread code allocation method in a CDMA cellular network as set forth in claim 1, further comprising the step of:

at a plurality of said mobile stations, measuring a channel quality value and informing said base station of said channel quality value and at said base station, determining a priority of said combined code based on said channel quality value informed, wherein a power ratio of a desired signal to an interference signal is taken as said channel quality value, and further comprising the step of:

checking a reception power of a common control signal sent out from a base station being connected to at least one of said mobile stations and a reception power of said common control signal sent out from a base station not being connected to any of said mobile stations to calculate a power ratio of a desired signal to an interference signal from a ratio of a reception power corresponding to said base station being connected to a reception power corresponding to said base station not being connected.

16. The spread code allocation method in a CDMA cellular network as set forth in claim 1, wherein as said first code set, a orthogonal code is used.

17. The spread code allocation method in a CDMA cellular network as set forth in claim 1, wherein as said second code set, a gold code or a part of the gold code is used.

18. A base station in a CDMA cellular network, comprising:

a first code set including a plurality of first codes and a second code set including one or a plurality of second codes, means for allocating said second code to said first code set and multiplying said plurality of first codes by said second code allocated to generate a plurality of combined codes, means for assigning a priority to said combined code for each transmission signal to be transmitted from a base station to a mobile station, means for allocating said combined code to said transmission signal based on said priority, and means for diffusing said transmission signal by the allocated combined code to transmit said transmission signal diffused to said mobile station, wherein said base station determines a priority of said combined code for each transmission signal based on a channel quality value measured by said mobile station.

19. The base station in a CDMA cellular network as set forth in claim 18, wherein said base station is informed of channel quality values measured at a plurality of said mobile stations to determine a priority of said combined code based on said channel quality values informed.

20. The base station in a CDMA cellular network as set forth in claim 18, wherein said base station is informed of channel quality values measured at a plurality of said mobile stations to determine a priority of said combined code based on said channel quality values informed, and sets a priority to said second code according to said channel quality value and sets a priority of said combined code to be higher as said second code attains a higher priority.

21. The base station in a CDMA cellular network as set forth in claim 18, wherein said base station is informed of channel quality values measured at a plurality of said mobile stations to determine a priority of said combined code based on said channel quality values informed, sets a priority to said second code according to said channel quality values and sets a priority of said combined code to be higher as said second code attains a higher priority, and provides an axis of a channel quality value representing said channel quality value and divides the axis of a channel quality value by a plurality of threshold values to set a channel quality value within the same value area among a plurality of value areas generated by the division by said threshold values to have the same priority of said second code.

22. The base station in a CDMA cellular network as set forth in claim 18, wherein said base station is informed of channel quality values measured at a plurality of said mobile stations and determines a priority of said combined code based on said channel quality values informed, and sets a priority to said first code according to said channel quality value and sets a priority of each combined code in a group of combined codes including the same second code to be higher as said first code attains a higher priority.

23. The base station in a CDMA cellular network as set forth in claim 18, wherein said base station is informed of channel quality values measured at a plurality of said mobile stations and determines a priority of said combined code based on said channel quality values informed, sets a priority to said first code according to said channel quality value and sets a priority of each combined code in a group of combined codes including the same second code to be higher as said first code attains a higher priority, and provides an axis of a channel quality value representing said channel quality value and divides the axis of a channel quality value by a plurality of threshold values to set a channel quality value within the same value area among a plurality of value areas generated by the division by said threshold values to have the same priority of said first code.

24. The base station in a CDMA cellular network as set forth in claim 18, wherein
said base station is informed of a channel quality value measured at said mobile station, and
checks the number of uses of each second code by a combined code including the same second code and determines a priority of said combined code based on said channel quality value informed and said number of uses of each second code.

25. The base station in a CDMA cellular network as set forth in claim 18, wherein
said base station is informed of a channel quality value measured at said mobile station,
checks the number of uses of each second code by a combined code including the same second code and determines a priority of said combined code based on said channel quality value informed and said number of uses of each second code,
when said channel quality value is not less than a quality threshold value, sets a priority of a combined code to be higher that includes a second code whose said number of uses of each second code by said combined code is smaller, and
when said channel quality value is less than said quality threshold value, sets a priority of a combined code to be higher that includes a second code whose said number of uses of each second code by said combined code is larger.

26. The base station in a CDMA cellular network as set forth in claim 18, wherein
said base station is informed of a channel quality value measured at said mobile station, checks the number of uses of each second code by a combined code including the same second code and determines a priority of said combined code based on said channel quality value informed and said number of uses of each second code, and
sets a priority to said first code and sets a priority of each combined code in a group of combined codes including the same second code to be higher as said first code attains a higher priority.

27. A spread code allocation method in a CDMA cellular network comprising:
having a first code set including a plurality of first codes and a second code set including one or a plurality of second codes,
allocating the second code to said first code set and generating a pair of said first code and said second code allocated,
assigning a priority based on channel availability to each of said pair of said first code and said second code allocated for each transmission signal to be transmitted from a base station to a mobile station,
allocating said pair of said first code and said second code allocated to said transmission signal based on said priority,
spreading said transmission signal by the assigned pair of said first code and said second code allocated, and
transmitting said transmission signal spread to said mobile station, wherein at a plurality of said mobile stations, measuring a channel quality value and informing said base station of said channel quality value, and
at said base station, determining a priority of said pair of said first code and said second code allocated based on said channel quality value informed.

28. The spread code allocation method in a CDMA cellular network as set forth in claim 27, further comprising:
setting a priority to said second code according to said channel quality value and setting a priority of said pair of said first code and said second code allocated to be higher as said second code attains a higher priority.

29. The spread code allocation method in a CDMA cellular network as set forth in claim 27, further comprising:
checking the number of uses of each second code by a combined code including the same second code and determining a priority of said combined code based on said channel quality value informed and said number of uses of each second code at said base station.

30. A CDMA cellular base station comprising:
a first code set including a plurality of first codes and a second code set including one or a plurality of second codes,
said base station
allocates the second code to said first code set and generating a pair of said first code and said second code allocated,
assigns a priority based on channel quality to each of said pair of said first code and said second code allocated for each transmission signal to be transmitted from a base station to a mobile station,
allocates said pair of said first code and said second code allocated to said transmission signal based on said priority
spreads said transmission signal by the assigned pair of said first code and said second code allocated, and
transmits said transmission signal spread to said mobile station, wherein
said base station is informed of channel quality values measured at a plurality of said mobile stations, and
determines a priority of said pair of said first code and said second code allocated based on said channel quality values informed.

31. The CDMA cellular base station as set forth in claim 30, wherein
said base station sets a priority to said second code according to said channel quality value, and
sets a priority of said pair of said first code and said second code allocated to be higher as said second code attains a higher priority.

32. The CDMA cellular base station as set forth in claim 30, wherein
said base station
checks the number of uses of each second code by a combined code including the same second code and determines a priority of said combined code based on said channel quality value informed and said number of uses of each second code.

* * * * *